United States Patent
de Mesentier Silva et al.

(10) Patent No.: US 12,109,496 B2
(45) Date of Patent: *Oct. 8, 2024

(54) PERSONA DRIVEN DYNAMIC CONTENT FRAMEWORK

(71) Applicant: Electronic Arts Inc., Redwood City, CA (US)

(72) Inventors: Fernando de Mesentier Silva, San Francisco, CA (US); Reza Pourabolghasem, Santa Clara, CA (US); Sundeep Narravula, Saratoga, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,322

(22) Filed: Mar. 24, 2022

(65) Prior Publication Data
US 2022/0212114 A1 Jul. 7, 2022

Related U.S. Application Data

(63) Continuation of application No. 17/074,314, filed on Oct. 19, 2020, now Pat. No. 11,311,810.

(51) Int. Cl.
*A63F 13/79* (2014.01)
*A63F 13/69* (2014.01)

(52) U.S. Cl.
CPC .............. *A63F 13/79* (2014.09); *A63F 13/69* (2014.09); *A63F 2300/5546* (2013.01)

(58) Field of Classification Search
None
See application file for complete search history.

(56) References Cited

U.S. PATENT DOCUMENTS

| | | | |
|---|---|---|---|
| 2012/0142429 A1* | 6/2012 | Muller | A63F 13/69 463/42 |
| 2014/0128166 A1* | 5/2014 | Tam | A63F 13/216 463/42 |
| 2015/0094143 A1* | 4/2015 | Brown | G06Q 30/0201 463/31 |

(Continued)

OTHER PUBLICATIONS

Office Action for U.S. Appl. No. 17/074,314, mailed on Oct. 20, 2021, Silva, "Persona Driven Dynamic Content Framework", 10 pages.

*Primary Examiner* — Jason T Yen
(74) *Attorney, Agent, or Firm* — Lee & Hayes, P.C.

(57) ABSTRACT

A persona system determines a player persona for a player of a gaming system based on gameplay information for the user and, for example, performs dynamic content generation or additional product recommendations based on the player persona. The persona system may receive a request for content based on a persona of a player and receive gameplay data associated with gameplay of the player in a plurality of games. The persona system may then generate a player persona of the player based on the gameplay data associated with the gameplay of the player in the plurality of games, determine persona based content based at least in part on a portion of the player persona, and output the persona based content in response to the request.

20 Claims, 6 Drawing Sheets

(56) References Cited

U.S. PATENT DOCUMENTS

| | | | |
|---|---|---|---|
| 2016/0001189 A1* | 1/2016 | Marr | A63F 13/95 |
| | | | 463/43 |
| 2016/0067612 A1* | 3/2016 | Ntoulas | A63F 13/335 |
| | | | 463/29 |
| 2018/0015370 A1* | 1/2018 | Sorek | A63F 13/67 |
| 2019/0270001 A1* | 9/2019 | Cozad | A63F 13/61 |
| 2019/0321730 A1* | 10/2019 | Shetty | A63F 13/67 |
| 2020/0298128 A1* | 9/2020 | Yannakakis | A63F 13/79 |
| 2022/0088474 A1* | 3/2022 | Dicken | A63F 13/67 |
| 2022/0118364 A1 | 4/2022 | de Mesentier Silva et al. | |

\* cited by examiner

| PLAYER | PERSONA | COMPETITIVE | COMBAT | EXPLORATION | ITEM ACQUISITION |
|---|---|---|---|---|---|
| PLAYER A | EXPLORER | 40 | 55 | 99 | 67 |
| PLAYER B | COMPETITOR | 95 | 95 | 95 | 50 |
| PLAYER C | COLLECTOR | 66 | 59 | 33 | 99 |
| PLAYER D | SUPPORT | 75 | 75 | 45 | 70 |
| PLAYER E | COMBATANT | 80 | 99 | 75 | 66 |
| PLAYER F | COMPETITOR | 99 | 95 | 66 | 70 |
| PLAYER G | TANK/LEAD | 75 | 80 | 50 | 57 |
| PLAYER H | COMMANDER | 55 | 66 | 60 | 50 |
| PLAYER I | COMPLETIONIST | 70 | 75 | 95 | 75 |

PERSONA DRIVEN DYNAMIC CONTENT FRAMEWORK

CROSS-REFERENCE TO RELATED APPLICATION(S)

This application is a continuation of and claims priority to U.S. application Ser. No. 17/074,314, filed on Oct. 19, 2020 and entitled "PERSONA DRIVEN DYNAMIC CONTENT FRAMEWORK," the entirety of which is incorporated herein by reference.

BACKGROUND

Computer gaming allows for players to play a variety of electronic and/or video games singularly or with each other via network connectivity, such as via the Internet. Computer gaming may be enabled by gaming system(s) where each of the players may connect using their respective client devices. In computer gaming, frustration may arise from gaming content which does not appeal to the user or the difficulty in finding suitable additional computer gaming content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describe methods, apparatuses, computer-readable media, and system(s) for determining a player persona for a user of a gaming system based on gameplay information for the user and, for example, performing dynamic content generation or additional product recommendations based on the player persona.

Players of computer games may have different personas. Example embodiments may observe different player personas based on different preferences or different approaches to experiencing games. Example embodiments may collect and analyze gameplay data for players to determine trends in their preferences and approaches when playing games. Some example trends that may be determined from gameplay data may be related to exploring the environment, engaging in combat, searching for collectibles, completing challenges or obtaining achievements and so on.

Using gameplay data for a player, a player persona may be generated. Player personas may be a general persona classification and/or a collection of measurements for a plurality of persona dimensions. The persona dimensions for the above example trends may be determined indicators of how much of time the player spent in combat; how much of a map did the player explore; how often did the player opt for harder/easier challenges, how fast was the player's progression in the main storyline (in relation to the average), and so on. The persona dimensions and other player data may then be input to a classifier that approximates players' preferences in relation to general personas or archetypes (e.g., competitor, explorer, completionism, etc.). For example, a player may be assigned an archetype classification of explorer with persona dimension values of 55 for a combat dimension, 35 for a competition dimension, 65 for a collector dimension, and 85 for an exploration dimension. In such a case, the persona dimension values may represent a score on a normalized distribution in which the median or average player would be assigned a 50. In an example, the above set of values may indicate the player does not like competitive games, is relatively average in desiring combat, collects a lot of items or objects and explores more than almost all other players. The classifier may determine the player's archetype as explorer as this is the strongest dimension and the second strongest dimension (e.g., collector) tends to be strong in explorers but weaker than the explorer dimension due to the likelihood of finding and collecting items while exploring.

The persona dimensions of the player personas may be generally derived from gameplay data from across multiple games. For example, the combat dimension of the player persona may be derived from gameplay data from multiple games including games of different genres (e.g., first person shooters, role-playing games, combat flight simulation games, etc.). Similarly, dimensions of player personas may not necessarily be derived from or applicable to all games. For example, gameplay data from a solitaire card game may be omitted or minimally considered in deriving the combat dimension of a player persona (e.g., consideration may be limited to determining combat play emphasis among all gameplay data for the player).

Using a player persona derived from gameplay data from multiple games, examples may tailor content presented to or suggested for the player. Examples may present or suggest tailored content in at least two contexts.

In some examples, the tailored content may be a suggestion for the unlocking of a new game or other product. Herein, "unlockable" content may refer to a new game or to in-game content that is not available for access and/or use by a player at a given time instance but can subsequently be unlocked, purchased, earned or otherwise obtained such that it can then be accessed or used by that player. As such, this type of recommendation is not limited to full titles and may also include add-ons, DLCs, content packs or other similar types of new in-game content. In some examples, a recommendation may be generated based on a determination that the player persona archetype or persona dimensions of a current player is similar to the personas of other players who have spent a lot of time in the new game or additional unlockable content being recommended. For example, a system may determine an average persona of other players who have spent a lot of time in the new game or additional unlockable content. The system may then determine a degree of similarity between the average persona and the player persona of the current player to which content is being recommended. The new game(s) or additional unlockable content(s) with the highest degree of similarity or with a degree of similarity exceeding a threshold may be recommended to the player. Of course, while examples herein relate to the unlocking of new content, examples are not so limited. Rather, other embodiments may relate to suggesting from among any additional content (e.g., additional content from a library of content), regardless of whether payment is given or the content was subject to a lock or access restriction.

In addition or alternatively, the tailored content may be dynamically generated content in a game currently being played (e.g., a programmatically built map that is tailored for exploration rather than combat based on the player persona dimensions of the player). In some examples, the player persona archetype or persona dimensions may be used to inform a dynamic content system that may consider the player persona to tailor the gameplay to either approximate or distance it from previous experiences. In some embodiments, a datastore or catalog of content generation algorithms or models for each game may be stored at the gaming systems or persona systems. For example, a set of content generation algorithms or models may be stored for a role playing shooter game including a content generation algorithm or model for dynamically generating level maps, a content generation algorithm or model for populating the level map with enemies or non-player characters, a content generation algorithm or model for adding challenges, puzzles or traps to the level map, a content generation algorithm or model for generating loot or item drops, a content generation algorithm or model for generating missions, and so on. Each of the content generation algorithms or models may generate content based in part on the player persona such that players with different player personas may be presented with different dynamically generated content. In operation, the gaming system or persona system may retrieve a algorithm or model corresponding to the content to be dynamically generated and input at least a portion of the player's persona into the algorithm or model generate the desired content based at least in part on the player's player persona.

Building the player personas from gameplay data collected across multiple games may provide more robust results. For example, because the player personas may be built from gameplay data collected across multiple games, dynamically generated tailored content may be provided even when a player has not had much interaction with the title (e.g., without a lag time to collect gameplay data for the current title).

Of course, embodiments are not limited to the specific examples given herein. For example, a player's persona may differ based on context. For example, a player's persona may be different depending on the type of game and/or character driven role the player may be performing. Some example contexts may be character or setup related such as character class, team choice, position or role preference, and so on. In a particular example, the player may have different in-game content preferences when playing a tank or defensive role from when the player plays the same game or type of game as a healer or support role. In some examples, each player may be associated with one or more player personas that correspond to different contexts. In such examples, dynamically generated content for a player may differ based on which player persona may be applies to the current context. In other examples, contextual preferences of the player may be built into the same player persona, such that different portions may be utilized in different contexts.

In another variation involving multiple players, the game system and/or persona system may consider the player persona of each player. For example, in a team play context, dynamic content to be presented to the team may be derived based on a combination or average of the team's player personas. In another example, the dynamic content may be derived by considering different player's player personas in generating different parts of the dynamic content (e.g., different sections of a game map may be directed to a respective team member's player persona).

The player persona of each of the players may be associated with the respective players by way of a user account of the corresponding player The user account for each of the players may associate various information about the respective players, in addition to his or her player persona, and may be stored in a player datastore and accessed by one or more persona system(s).

Further, as players engage in additional gameplay, the persona system(s) disclosed herein may perform additional training or otherwise update player personas based on additional gameplay information. In this manner, the player personas may be refined or evolve to provide tailored content to the players, even if the players' behaviors, preferences and playstyle evolve over time.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

Figure 1:
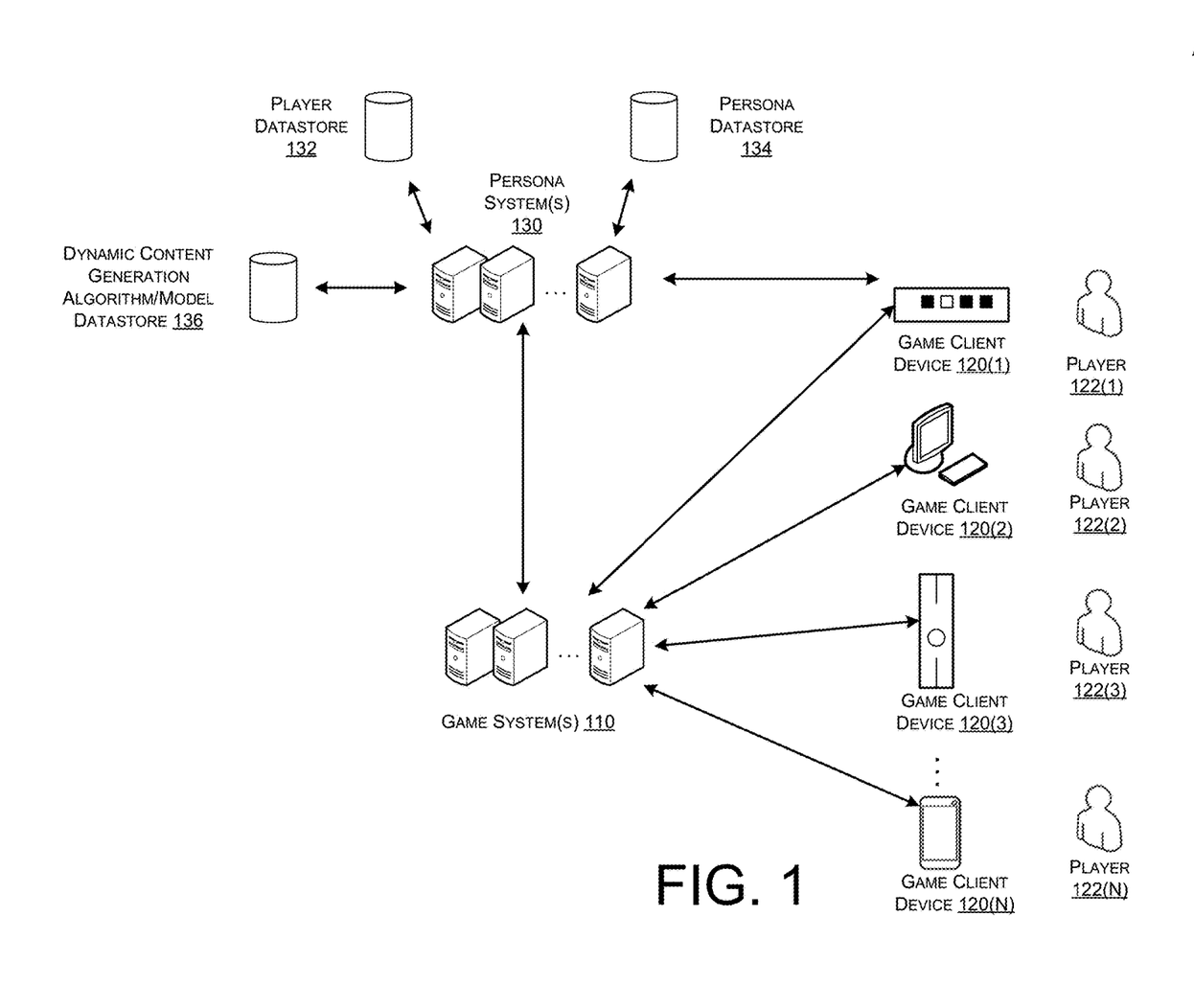
FIG. 1 illustrates a schematic diagram of an example environment with game system(s), game client device(s) and persona system(s) that may enable computer gaming including the presentation of persona driven dynamic content, in accordance with example embodiments of the disclosure.

FIG. 1 illustrates a schematic diagram of an example environment 100 with game system(s) 110, game client device(s) 120 and persona system(s) 130 that enable computer gaming including the presentation of persona driven dynamic content, in accordance with example embodiments of the disclosure.

The example environment 100 may include one or more player(s) 122(1), 122(2), 122(3), . . . 124(N), hereinafter referred to individually or collectively as player(s) 122, who may interact with respective game client device(s) 120(1), 120(2), 120(3), . . . 120(N), hereinafter referred to individually or collectively as game client device(s) 120 via respective input device(s).

The game client device(s) 120 may receive game state information from the one or more game system(s) 110 that may host the game played by the player(s) 122 of environment 100. The game state information may be received repeatedly and/or continuously and/or as events of the game transpire. The game state information may be based at least in part on the interactions that each of the player(s) 122 has in response to events of the game hosted by the game system(s) 110. Though discussed primarily herein in the form of an online game, embodiments are not so limited and may include single player or non-online gaming in which game state data is uploaded to the game system(s) 110 or persona system(s) 130 for use in providing persona driven dynamic content but in which the other operations of the game system(s) 110 are provided by the game client device(s) 120.

The game client devices 120 may be configured to render content associated with the game to respective players 122 based at least on the game state information. More particularly, the game client device(s) 120 may use the most recent game state information to render current events of the game as content. This content may include video, audio, haptic, combinations thereof, or the like content components.

As events transpire in the game, the game system(s) 110 may update game state information and send that game state information to the game client device(s) 120. For example, if the players 122 are playing an online soccer game, and the player 122 playing one of the goalies moves in a particular direction, then that movement and/or goalie location may be represented in the game state information that may be sent to each of the game client device(s) 120 for rendering the event of the goalie moving in the particular direction. In this way, the content of the game is repeatedly updated throughout game play.

When the game client device(s) 120 receive the game state information from the game system(s) 110, a game client device 120 may render updated content associated with the game to its respective player 122. This updated content may embody events that may have transpired since the previous state of the game (e.g., the movement of the goalie).

The game client device(s) 120 may accept input from respective players 122 via respective input device(s). The input from the players 122 may be responsive to events in the game. For example, in an online basketball game, if a player 122 sees an event in the rendered content, such as an opposing team's guard blocking the point, the player 122 may use his/her input device to try to shoot a three-pointer. The intended action by the player 122, as captured via his/her input device, may be received by the game client device 120 and sent to the game system(s) 110.

The game client device(s) 120 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 120 may execute programs thereon to interact with the game system(s) 110 and render game content based at least in part on game state information received from the game system(s) 110. Additionally, the game client device(s) 120 may send indications of player input to the game system(s) 110. Game state information and player input information may be shared between the game client device(s) 120 and the game system(s) 110 using any suitable mechanism, such as application program interfaces (APIs).

The game system(s) 110 may receive inputs from various player(s) 122 and update the state of the online game based thereon. As the state of the online game is updated, the state may be sent to the game client device(s) 120 for rendering online game content to players 122. In this way, the game system(s) 110 may host the online game.

The example environment 100 may further include persona system(s) 130 that may be configured to collect gameplay data associated with players 122, generate player personas for the players 122, and utilize the player personas to provide persona driven dynamic content such as dynamically generated in-game content or game or product recommendations based on player personas.

During operation, the personas system(s) 130 may receive an indication from the game system(s) 110 that persona driven dynamic content is to be presented to the players 122 along with information that may be utilized in generating the content. For example, the persona system(s) 130 may receive a request for a particular instance of persona driven dynamic content (e.g. a request for game or product recommendations or a request for specified dynamically generated in-game content such as a map, an enemy population, a loot drop, etc.). The received request may further include an identifier of the player (e.g., an identifier usable with a player datastore 132 to obtain gameplay and/or persona information of the player).

Using the player identifier and the parameters of the request, the persona system(s) 130 may determine player persona data for the identified player 122. If the persona datastore 134 includes an up-to-date player persona for the identified player, the persona system 130 may retrieve the existing player persona of the identified player. Otherwise, the persona system(s) 130 may initially select a game from a list of games already associated with the identified player 122. The persona system(s) 130 may then extract gameplay data for the identified player 122 for the selected game. For example, the persona system(s) 130 may extract the gameplay data from the player datastore 132. As mentioned above, the player datastore may include records for a user account for each of the players 122. The user account may associate various information about the respective players 122 and may be stored in the player datastore 132 and accessed by the persona system(s) 130.

In some examples, at least a portion of the extracted gameplay data for the selected game may be normalized based on a profile of the selected game. Normalization may be performed because, in some examples, raw gameplay data measurements for some player persona dimensions may not accurately reflect behaviors and motivations of the player. For example, for a game which entirely focuses on combat, while serving as an indication that the player likes combat, the raw gameplay data may be less informative than gameplay data extracted from a game with a broader range of styles. In particular, the high amount of combat game play in a combat game does not necessarily show an extreme preference over other styles or approaches that are unavailable. If gameplay data from a game in which options for completing challenges from a wide variety of styles and approaches are available, but the gameplay data includes a high proportion of combat gameplay, the system has stronger evidence that the player prefers combat (e.g., assuming other factors are equal). However, other factors may be relevant. For example, if the other styles or approaches are present for completing challenges but are hidden options, a higher ratio of combat to the other approaches may not be reflective of a preference for combat, but it may show a preference for combat over searching for secrets. Some examples may normalize the gameplay data to the ratio of the gameplay content in the game that is associated with the persona dimensions to the total gameplay content of the game, the average player gameplay profile for the game, or similar data.

The following discussion provides examples of normalized gameplay data generation in particular scenarios. Implementations are not limited to these approaches. The extraction of gameplay data and generation of normalized gameplay data based there on may vary from implementation to implementation.

In the scenario of determining an exploration dimension of a player persona in a first person role-playing game, the persona system 130 may retrieve information indicating the percentage of the area of maps or levels played by the player that the player explored. In games in which a player may play through the same level multiple times and in which the map of the level varies for each play through (e.g. is procedurally generated), the persona system 130 may extract or determine the exploration percentage for each play through by the player. The persona system 130 may then determine an average exploration percentage for the player. The player's average exploration percentage may then be normalized to the average exploration percentage of the player base of the game. Implementations are not limited to exploration percentage and other metrics and/or levels of detail may be tracked for the exploration dimension. For example, some embodiments may track the time spent by the player traversing new areas of the environment. Depending on the level of detail desired, the persona system 130 may distinguish and exclude time spent in combat and/or time spent traversing new areas of the environment while the player was engaged in seek and destroy missions. The time spent traversing new areas of the map may be divided by the player's active play time in the game and then normalized to the average value of this metric for the player base of the game. The persona system 130 may combine the metrics in various ways such as by determining a sum of the normalized values of the metrics relating to exploration. The combined metric may then be normalized to the profile of the game (e.g. as the ratio of the determined combined metric to the average of the combined metric for the player base of the game and/or a measure of the amount of exploration content in the game).

In the scenario of determining a combat dimension of a player persona in a role-playing game, the persona system 130 may retrieve information indicating a total number of encounters completed or started by the player as well as whether the player chose to engage in combat in the encounters. The persona system 130 may include both avoidable combat-only encounters and encounters in which options other than combat were available but exclude unavoidable combat-only encounters. The persona system 130 may determine the percentage of encounters in which other options were available that the player chose combat and a ratio of avoidable combat encounters to time spent playing the game. The percentage and ratio may each be normalized to the average of these measures for the player base of the game and combined. The combined metric may then be normalized to the profile of the game. As mentioned previously, some embodiments may include additional levels of detail or lower levels of detail to that discussed here.

In the scenario of determining persona dimensions related to player preferences on enemy types based on gameplay data from a combat oriented game with procedurally generated level maps, the persona system 130 may determine a persona dimension for each of a plurality of categories of enemies (e.g., enemies with stealth, enemies that have a particular elemental type of damage, enemies with auras that buff other enemies, swarm enemies, etc.). Embodiments may utilize such persona dimensions in various ways. For example, some embodiments may utilize persona dimensions relating to categories of enemies to influence how procedurally generated level maps are populated. Some players may disfavor certain categories of enemies. If a player repeatedly encounters disfavored enemies, the player may become frustrated. This may also become disruptive in multiplayer gaming. For example, if a particularly hated enemy type is encountered repeatedly and the player becomes frustrated, the player may resort to disconnecting from instances of the game to restart the level with different enemies. If other players must abandon the current instance (e.g., to follow their teammate or because the level may be very difficult to complete without a full team), the other players may resent the perceived waste of time caused by the frustrated player. This may be ameliorated by presenting the player with the disfavored categories of enemies less often.

To this end, in some embodiments, the persona system 130 may extract gameplay data indicative of instances of mid-level disconnects by the player. The persona system 130 may then exclude instances at the player's normal log off times. The persona system 130 may also flag instances in which the player restarted the level within a threshold amount of time and/or instances involving multiple deaths and respawns prior to the mid-level disconnect. The persona system 130 may then determine the percentage of disconnects involving each category of enemy. The percentage determination may provide for a higher weight to flagged instances (e.g., the system may count a flagged instance as two mid-level disconnects). The percentages may be normalized to how often each category of enemy has appeared in the game for the player. The persona dimensions may also be normalized to the player base of the game and the profile of the game. As an example use case, an algorithm or model that procedurally generates enemies to populate a level map may be configured to reduce the frequency of appearance of enemies of categories of enemies whose associated persona dimension is above a threshold value.

The above discussion merely provides example determinations of normalized gameplay data that may be used to determine persona dimensions and/or potential uses for such data. Variations and alternatives would be apparent to one of ordinary skill in the art based on this disclosure. For example, some embodiments may alternatively or additionally determine other normalized gameplay data such as metrics based on an amount of distance traveled (e.g., represented in number of pixels) or a number of times the game, level, area, or challenge was started.

The persona system 130 may then determine whether another game is associated with the player for which there is unextracted gameplay data. If so, the persona system may repeat the extraction and normalization process. Otherwise, the persona system 130 may utilize the extracted and/or normalized gameplay data of the player for each game associated with the player to generate a player persona for the player. For example, the persona system 130 may generate values representing magnitudes of specific dimensions of the player persona (e.g., a combat dimension, an exploration dimension, a collector dimension, a support dimension, a challenge dimension, etc.) from the normalized gameplay data. In some examples, the normalized gameplay data associated with each persona dimensions may be combined using a weighted average to determine the persona dimension of the player persona. The persona system 130 may then utilize the normalized gameplay data and/or the values of the persona dimensions of the player persona to determine an archetype that describes the general persona of the player (e.g., Explorer, Competitor, Completionist, Commander, Leader, etc.). The generation of the archetype may be performed using a machine learned model (e.g., trained using guided learning) or may be performed procedurally (e.g., based on specified criteria). For example, a procedural classification system may be configured to determine that the Explorer is to be assigned to players whose highest player persona dimension is exploration with tiebreaker rules. For example, if a player's highest persona dimensions are combat and exploration and the second persona dimension is to be collector dimension, the player may be assigned Explorer. Many other aspects of players' persona may be utilized in player personas. As mentioned above, generally, aspects of players' player personas may relate to motivations of the players or to which interactions may be satisfying to the players. The aspects of players' player persona utilized for different genres or different individual games may vary from example to example.

However, embodiments are not limited to determining a player persona as player persona dimensions based on normalized gameplay data and an archetype based on the player persona dimensions. For example, in other example embodiments, the system may determine normalized gameplay data, determine one or more archetype(s) based on the normalized gameplay data (e.g., primary archetype, secondary archetype, etc.) and either use an archetype as the player persona, or use archetypes as dimensions of the player personas.

In another example embodiment, the system may determine the normalized gameplay data and run a dimensionality reduction algorithm (e.g., principal component analysis). In such an example, the algorithm may map the gameplay data to a lower-dimensional space where variance may be maximized. The dimensions in this new space may then be used to define the profile of the game. Then, the system may perform a clustering operation to identify potential clusters that may represent personas.

The player persona of the player may then be stored in the persona datastore 134. While the persona datastore 134 is illustrated and described herein as a separate datastore from the player datastore 132, implementations are not so limited and may include a datastore that combines the player datastore 132 and the persona datastore 134.

The persona system(s) 130 may then turn to fulfilling the request for the persona driven dynamic content. Two example types of requests are discussed herein, requests for product recommendations based on player personas and requests for dynamically generated custom content (e.g., in-game content such as level layout or other procedurally or algorithmically generated content).

In response to a request for recommendations for additional games or unlockable in-game content (e.g., DLCs, weapon packs, boosters, etc.) based on player personas, the persona system 130 may begin by retrieving or generating an average player persona for the player base of the additional game and or the additional in-game content. For example, an average player persona may be an average of the player personas of the most active players in the game or in-game content that is being evaluated for recommendation. The persona system(s) 130 may query the persona datastore 134 to determine if a current average player persona for the game or in-game content being evaluated for recommendation is available. If so, the persona system(s) 130 may retrieve the stored averaged player persona. Otherwise, the persona system(s) 130 may query the player datastore 132 to determine the most active players of the game or in-game content being evaluated for recommendation. The persona system(s) 130 may then retrieve or determine the player personas of the determined players and determine an average player persona based thereon. The persona system(s) 130 may then determine a similarity between the player persona of the current player 122 and the average player persona of the player base of each game. The persona system(s) 130 may then make recommendations based on the degree of similarity between the player persona of the player 122 and average persona for the game or in-game content. Rather than combat based on the persona dimensions), The persona system(s) 130 may then compare the average persona for the player bases to the player persona of the current player to determine a degree of similarity. The persona system(s) 130 may recommend the additional games or unlockable in-game content whose average player persona has the highest degree of similarity with the player persona of the current player or a degree of similarity higher than or equal to a threshold.

In addition or alternatively, in response to a request for dynamically generated custom content in a game currently being played (e.g., a programmatically built map that is tailored for exploration), the persona system 130 may begin by retrieving a dynamic content generation algorithms or models from a dynamic content generation algorithm or model datastore 136. The dynamic content generation algorithm or model datastore 136 may store dynamic content generation algorithms or models for each game. More particularly, the persona system(s) 130 may retrieve a dynamic content generation algorithm or model which is configured to utilize the player's archetype or persona dimensions to inform a dynamic content generation (e.g., consider the player persona to tailor the gameplay to either approximate or distance it from previous experiences) for particular content. In operation, the gaming system 110 or persona system 130 may retrieve a corresponding algorithm or model by querying the dynamic content generation algorithm or model datastore 136 based on the game and/or details of the request to obtain the corresponding dynamic content generation algorithm or model. Each of the dynamic content generation algorithms or models may generate content based in part on player personas such that players with different player personas may be presented with different dynamically generated content.

The dynamic content generation algorithms or models may include certain algorithms tailored to use certain metrics and dimensions to inform the generation of the output of the dynamic content generation algorithm or model. In some examples, the dynamic content generation algorithm or model may be a evolutionary algorithm. Such algorithms may be inspired by the biological evolutionary process. An evolutionary dynamic content generation algorithm may start by generating (e.g., randomly) several candidates, which would configure a population. The algorithm may then evaluate each candidate based on a fitness function. A set of candidates may then be selected based on their fitness score. The selected candidates may then be submitted to a combination of mutation (e.g., in which a small change may be made to an individual candidate's representation), and crossover (e.g., in which parts of the representation of two or more individual selected candidates may be stitched together to create new candidate(s)). This process (e.g., from fitness evaluation to mutation and crossover) may be repeated until a certain criteria is met (e.g., either a set fitness score is met by the current population of candidates or the process has been repeated a fixed number of times). In this scenario, a metric may be referred in the fitness function (e.g., for weighting different dimensions of gameplay).

In a specific example, a cellular automata algorithm can be used as a dynamic content generation algorithm to populate a map with game objects. The cellular automata algorithm may do so by dividing the map in tiles (or cells). then, starting at a specific tile (e.g., chosen at random), the cellular automata algorithm may determine whether to place none, one, or multiple game objects at that tile. This determination may be performed by referring to at neighboring tiles and following pre-defined rules that guide the determination. The cellular automata algorithm may then repeat the decision at a neighbor tile until all are visited. The pre-defined rules that may guide the determination may be expressed in terms of the dimensions of player personas. For example, a rule may define the minimal distance between two collectibles which is derived from the Exploration dimension (e.g., a formula that may provide that sets a minimum distance higher as the Exploration dimension value increases or biases the determination of whether to place the collectable in a tile against placing the collectable near other collectables or a main travel path of the map). Another example rule may determine the number of enemies that should be contained in a matrix formed by M×N adjacent tiles as a function of the value of the Competitor and Combat dimensions. Of course, the above rules are not limited to direct determinations and may include randomized variations and may output values representing biases in the determination for individual tiles.

Once the persona system(s) 130 has retrieved the corresponding algorithm or model, the persona system(s) 130 may be configured to input at least a portion of the player's player persona into the algorithm or model to generate content based on the player persona (e.g., such that the generation of the content is influenced by the player persona). The persona system(s) 130 may then return the content generated by the algorithm or model to the game system(s) 110 for presentation to the player 122 in gameplay.

Figure 2:
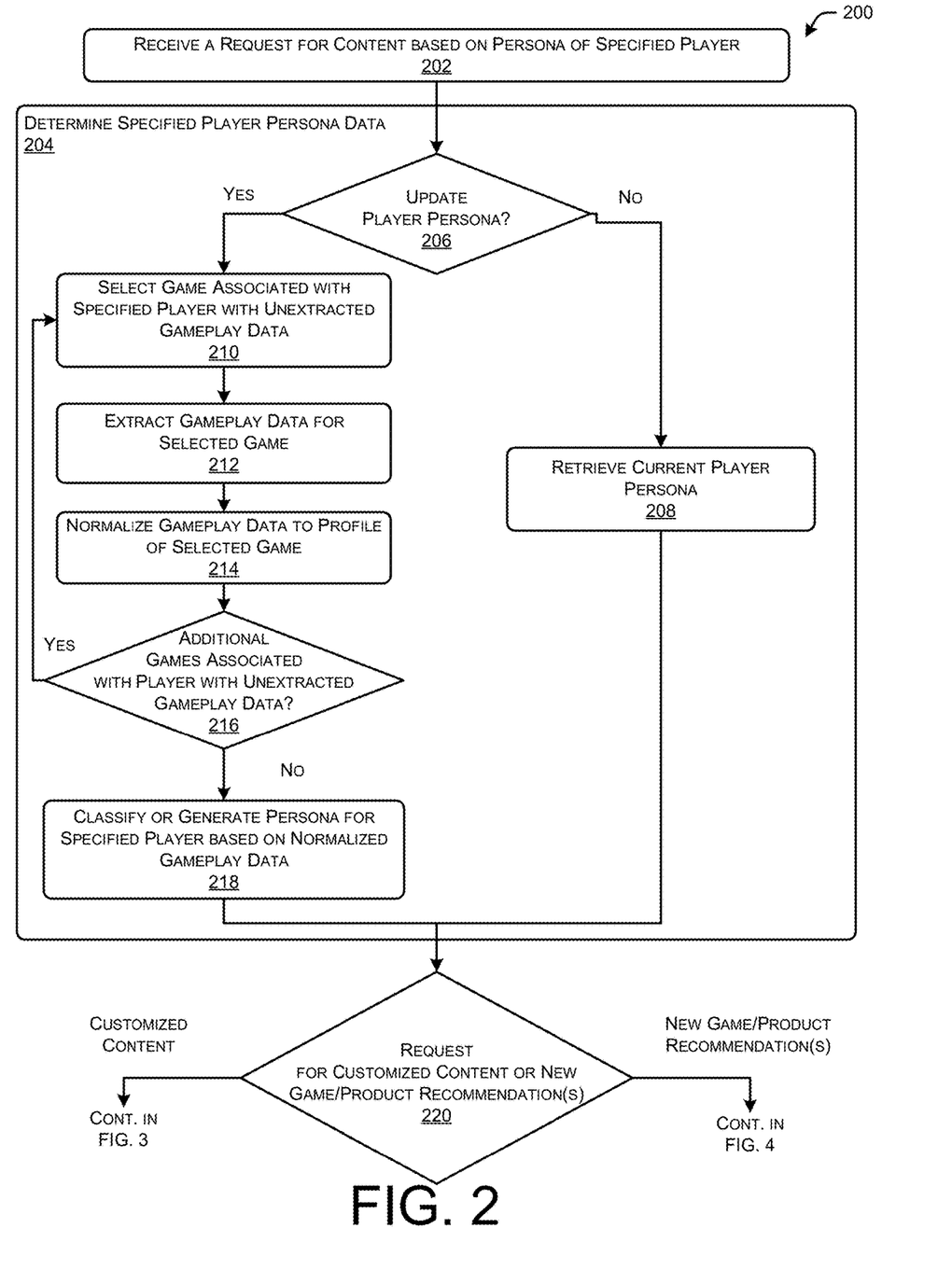
FIG. 2 illustrates a flow diagram of an example method to enable computer gaming including the presentation of persona driven dynamic content, in accordance with example embodiments of the disclosure.

FIG. 2 illustrates a flow diagram of an example method 200 to enable computer gaming including the presentation of persona driven dynamic content, in accordance with example embodiments of the disclosure. The method 200 may be performed by the persona system(s) 130, individually or in cooperation with one or more other elements of the environment 100.

At block 202, the persona system(s) 130 may receive a request for content based on the player persona of a specified player 122. The specified player 122 may be identified by the persona system(s) 130 based at least in part on a message and/or an indication from the game system(s) 110 and/or game client device(s) 120. In example embodiments, a player identifier, such as a player account login or other profile information, corresponding to players 122 may be used to identify the players 122 for which persona driven dynamic content is to be presented.

At block 204, the persona system(s) 130 may determine the specified player's player persona data. Initially, at block 206, the persona systems 130 may determine whether to perform an update of the player persona of the specified player 122 or if an up to date player persona is available in the persona datastore 134. If an up to date player persona is available, the process may continue to block 208. Otherwise, the process may continue to block 210.

At block 208, the persona system(s) 130 may retrieve the player persona of the specified player 122 from the persona datastore 134. The process may then continue to block 220.

Returning to block 210, the persona system(s) 130 may select a game associated with the specified player with unextracted gameplay data. At block 212, the persona system(s) 130 may extract gameplay data for the specified player for the selected game. Next, at block 214, the persona system(s) 130 may normalize the extracted gameplay data to the profile of the selected game as discussed above.

In some cases, if a player 122 does not have an established playing history then a default player persona may be ascribed to him/her until he/she establishes a playing history sufficient to provide a basis for determining the motivations of the player or interactions that may be satisfying to the player.

At block 216, the persona system(s) 130 may determine whether additional games are associated with the player for which there is unextracted gameplay data. If so, the process may return to block 210. Otherwise, the process may continue to block 218.

At block 218, the persona system(s) 130 may classify or generate a player persona for the specified player based on the normalized gameplay data. For example, the persona system 130 may utilize the extracted and/or normalized gameplay data of the player for each game associated with the player to classify or otherwise generate a player persona for the player 122. The gameplay dimensions of the player persona may be generated based on a weighted average of the normalized gameplay data (e.g. weighted based on playtime in each game). Alternatively or in addition, the gameplay dimensions of players the persona may be determined by a machine learning algorithm. Similarly, a general behavior classification of the player may be determined based on the weighted average, using a machine learning algorithm, and so on. The player persona of the player may then be stored in the persona datastore 134. The process may then continue to 220.

At block 220, the persona system(s) 130 may determine whether the request for customized content based on the player persona of the specified player is directed to customized in-game content or a recommendation for a new game or product. If the request is determined to be directed to customized content, the process may continue to 302 in FIG. 3. Otherwise, the process may continue to 402 in FIG. 4 to determine a new game or product recommendation.

It should be noted that some of the operations of method 200 may be performed out of the order presented, with additional elements, and/or without some elements. Some of the operations of method 200 may further take place substantially concurrently and, therefore, may conclude in an order different from the order of operations shown above. Further, implementations are not limited to the details of the above examples and variations are possible. For example, while method 200 may be performed for a specific player, other examples may perform persona generation in a batch manner.

Figure 3:
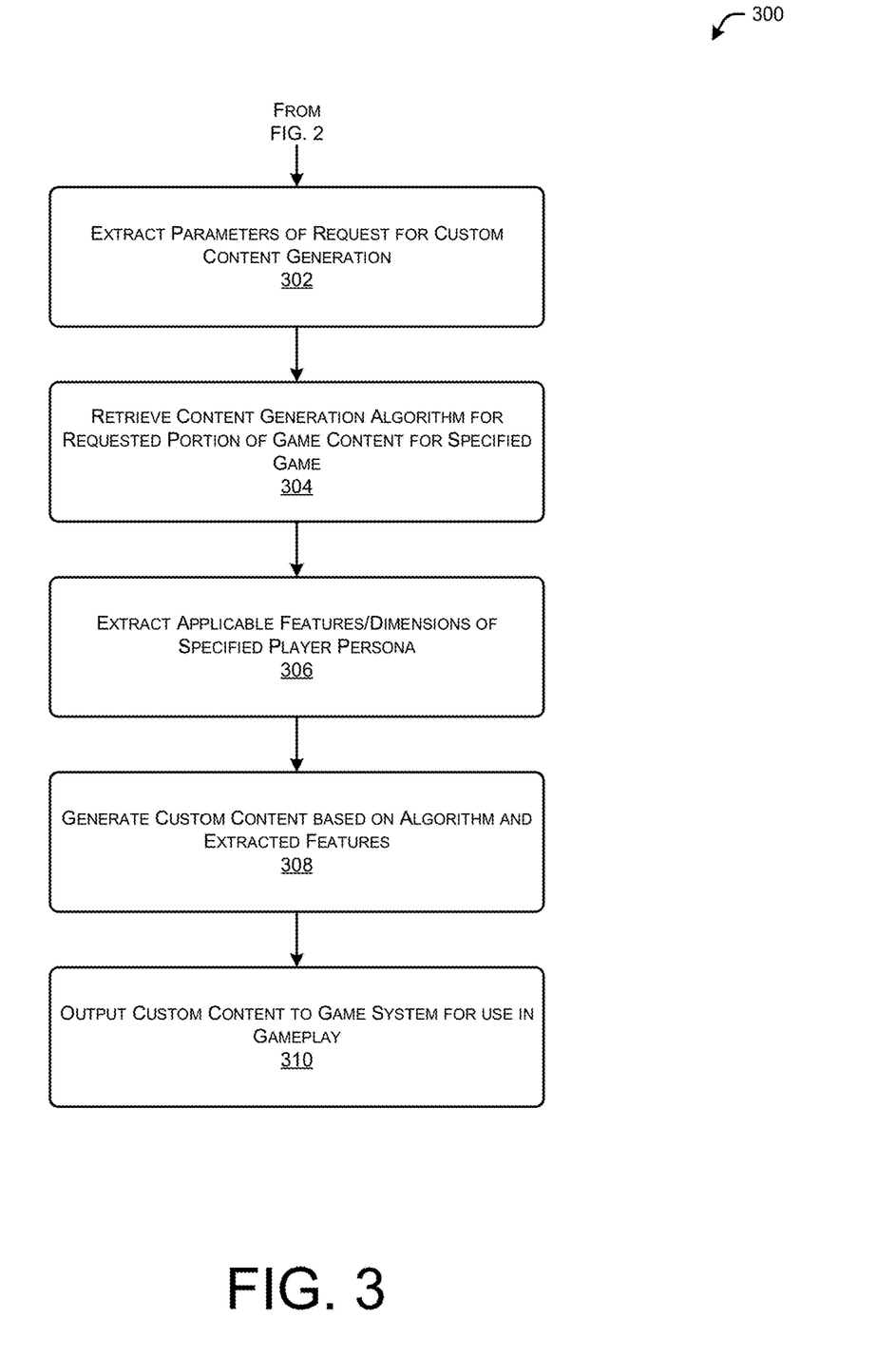
FIG. 3 illustrates a flow diagram of an example method to enable computer gaming including the presentation of persona driven dynamic content, in accordance with example embodiments of the disclosure.

FIG. 3 illustrates a flow diagram of an example method 300 to enable computer gaming including the presentation of persona driven dynamic content, in accordance with example embodiments of the disclosure. More particularly, method 300 may enable the presentation of customized content (e.g., in-game content) generated based on a player persona. In some examples, the method 300 follows method 200. However, examples are not so limited and methods 200 and 300 may both be performed separately or in conjunction. The method 300 may be performed by the persona system(s) 130, individually or in cooperation with one or more other elements of the environment 100.

At block 302, the persona system(s) 130 may extract the parameters of the request for custom content. For example, the request may include parameters that specify the game, a content type, and a specified context. For example, the request may specify a particular game, that the content is a level map and context such as level details (e.g., identification of a dungeon and level of a dungeon in an RPG).

At block 304, the persona system(s) 130 may retrieve a content generation algorithm for the requested portion of game content for the specified game. The dynamic content generation algorithm or model datastore 136 may store dynamic content generation algorithms or models for each game. More particularly, the persona system(s) 130 may retrieve a dynamic content generation algorithm or model which is configured to utilize the player's archetype or player persona dimensions to inform a dynamic content generation (e.g., consider the player persona to tailor the gameplay to either approximate or distance it from previous experiences) for particular content. In operation, the gaming system 110 or persona system 130 may retrieve a corresponding algorithm or model by querying the dynamic content generation algorithm or model datastore 136 based on the game and/or details of the request to obtain the corresponding dynamic content generation algorithm or model. Each of the dynamic content generation algorithms or models may generate content based in part on the player persona such that players with different personas may be presented with different dynamically generated content. For example, a level map generated for a player with an explorer player persona may include a wider layout with dead ends and a lower density of enemies when compared to a level map generated for a player with a combat player persona.

At block 306, the persona system(s) 130 may extract applicable features or dimensions of specified player persona. For example, an algorithm or model that dynamically generates a combat level map and enemies to populate the combat map may utilize a subset or all of the features or dimensions of the specified player persona. At block 308, the persona system(s) 130 may generate the requested custom content based on the retrieved algorithm or model and the extracted features or dimensions of the specified player persona. For example, the persona system(s) 130 may be configured to input at least a portion of the player's player persona into the algorithm or model to generate content based on the player's player persona (e.g., such that the generation of the content is influenced by the player persona). In a particular example, AI agents may be trained to approximate the behavior of different player personas. For example, one AI agent may be trained to mimic the Competitive persona, one AI agent may be trained to mimic the Explorer persona, and so on. The AI agents may be trained using various approaches. For example, an AI agent may be trained using imitation learning (e.g., where gameplay data from players that represent that persona may be fed to the agent) or by evolving a Monte Carlo Tree Search (MCTS) policy (e.g., where the system may use an evolutionary algorithm to shape a policy function of a MCTS agent, evaluate the gameplay data from that agent in order to classify what persona it would be, and choose the policy that best approximates a particular persona). Once AI agent(s) are trained, the system may utilize a search based approach (e.g., an Evolutionary Algorithm) to generate multiple potential versions of the requested custom content. The system may then have the AI agents play a series of games using the multiple potential versions of the content and evaluate the versions according to certain features. For a generated map, these features may be how many times the agent succeeded in completing the level, how many collectibles the agent found, how many enemies the agent engaged with, and so on. For a generated loot drop or weapon, the features may be how many enemies the agent defeated, how many shots the agent fired, how many times the agent missed a shot, the average distance in combat from enemies to the agent, and so on. Then, the system may utilize a function to weight these different features to score the versions of the requested custom contents in relation to the different personas.

At block 310, the persona system(s) 130 may then return the content generated by the algorithm or model to the game system(s) 110 for presentation to the player 122 in gameplay.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
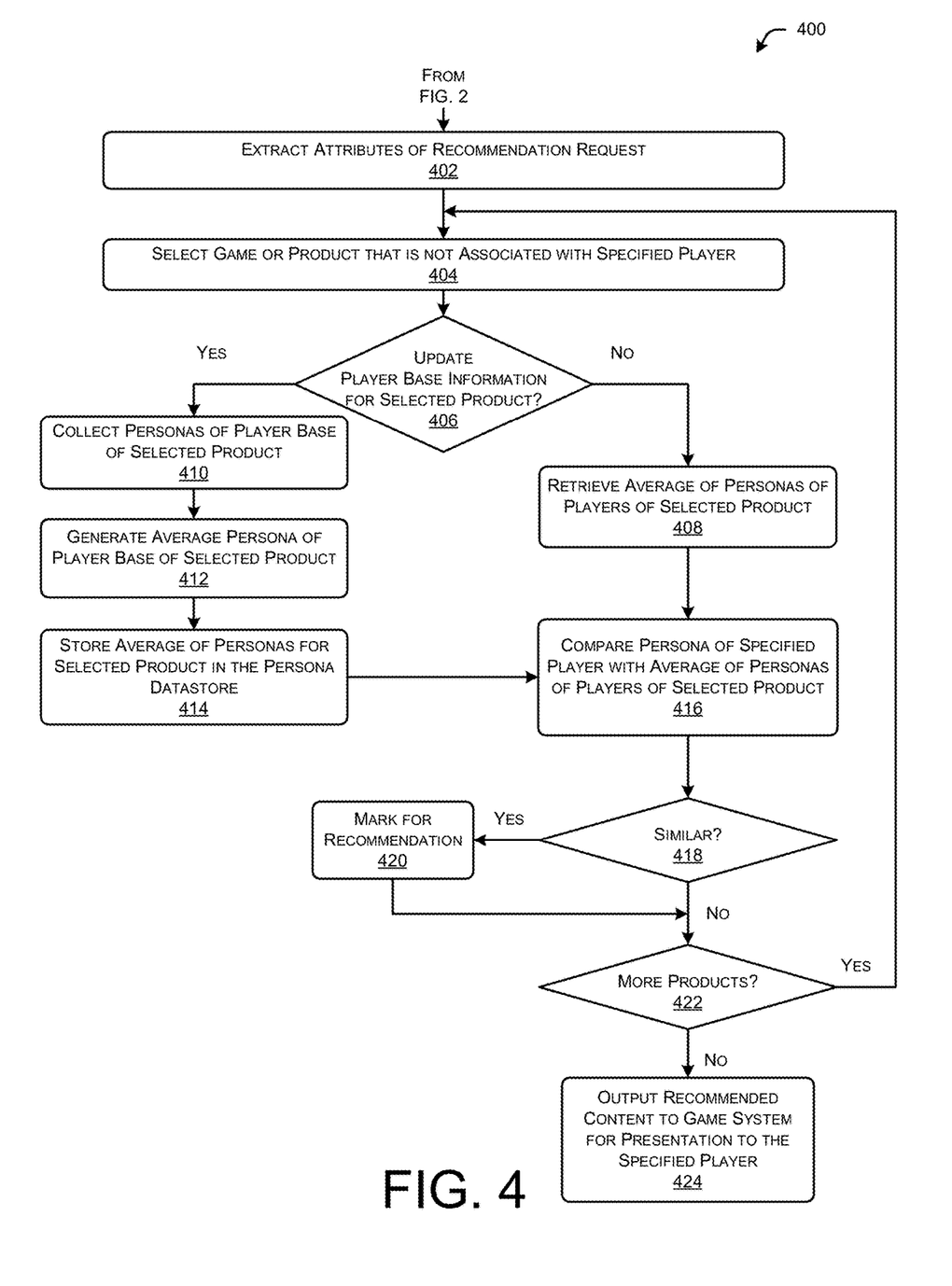
FIG. 4 illustrates a flow diagram of an example method to enable computer gaming including the presentation of persona driven dynamic content, in accordance with example embodiments of the disclosure.

FIG. 4 illustrates a flow diagram of an example method 400 to enable computer gaming including the presentation of persona driven dynamic content, in accordance with example embodiments of the disclosure. More particularly, method 400 may enable the presentation of recommendations for additional games or unlockable in-game content based on a player persona. In some examples, the method 400 follows method 200. However, examples are not so limited and methods 200 and 400 may both be performed separately or in conjunction. The method 400 may be performed by the persona system(s) 130, individually or in cooperation with one or more other elements of the environment 100.

At block 402, the persona system(s) 130 may extract parameters of the request for recommendations for additional games or unlockable in-game content based on a player persona. For example, the request may include parameters that specify the genre, a game associated with the player for which unlockable in-game content is available, one or more filters and so on.

At block 404, the persona system(s) 130 may select a game or product that is not associated with the specified player and which may satisfy any filters included in the requested parameters. For example, a specified player may have indicated a desire to be presented with recommendations for role-playing games. In response, the persona system(s) 130 may select a role-playing game which is currently not associated with the specified player to be analyzed for a recommendation.

At block 406, the persona system(s) 130 may determine whether to perform an update of the average persona and/or other player base information of the selected game or product or if the average persona and/or other player base information of the selected game or product, if available in the persona datastore 134, is up to date. For example, the average persona may be an average of the player personas of the most active players of the game or in-game content that is being evaluated. The persona system(s) 130 may query the persona datastore 134 to determine if a current average persona is available. If not, an update is to be performed and the process may proceed to 410. Otherwise, the process may continue to 408.

At block 408, the persona system(s) 130 may retrieve the average persona and/or other player base information of the selected game or product from the persona datastore 134. The process may then continue to 416.

Returning to block 410, the persona system(s) 130 may collect player personas of the player base of the selected game or product for use in generating an average persona and/or other information. For example, the persona system(s) 130 may query the player datastore 132 to determine the most active players of the game or in-game content being evaluated. The persona system(s) 130 may then retrieve or determine the player personas of the determined players.

At block 412, the persona system(s) 130 may determine an average persona based on the collected player personas of the player base of the selected game. At block 414, the persona system(s) 130 may store the average persona of the players of the selected game in the persona datastore 134.

At block 416, the persona system(s) 130 may compare the player persona of the specified player with the average persona of the selected game. At block 418, the persona system(s) 130 may determine a degree of similarity between the player persona of the specified player 122 and the average persona of the player base of the selected game. For example, the persona system(s) 130 may utilize a threshold similarity determination or other suitable similarity evaluations. If the player persona of the specified player 122 and the average persona of the player base of the selected game are sufficiently similar, the process may continue to block 420. Otherwise, the process may continue to block 422.

At block 420, the persona system(s) 130 may mark the selected game or product for recommendation to the specified player 122. The process may then continue to block 422.

At block 422, the persona system(s) 130 may determine whether additional games or products should be evaluated for recommendation. If so, the process may return to block 404. Otherwise, the process may continue to block 424.

At block 424, the persona system(s) 130 may output the recommended content(s) to the game system 110 for presentation to the specified player 122. As mentioned above, the persona system(s) 130 may make recommendations based on the degree of similarity between the player persona of the specified player 122 and average persona for the game or product.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
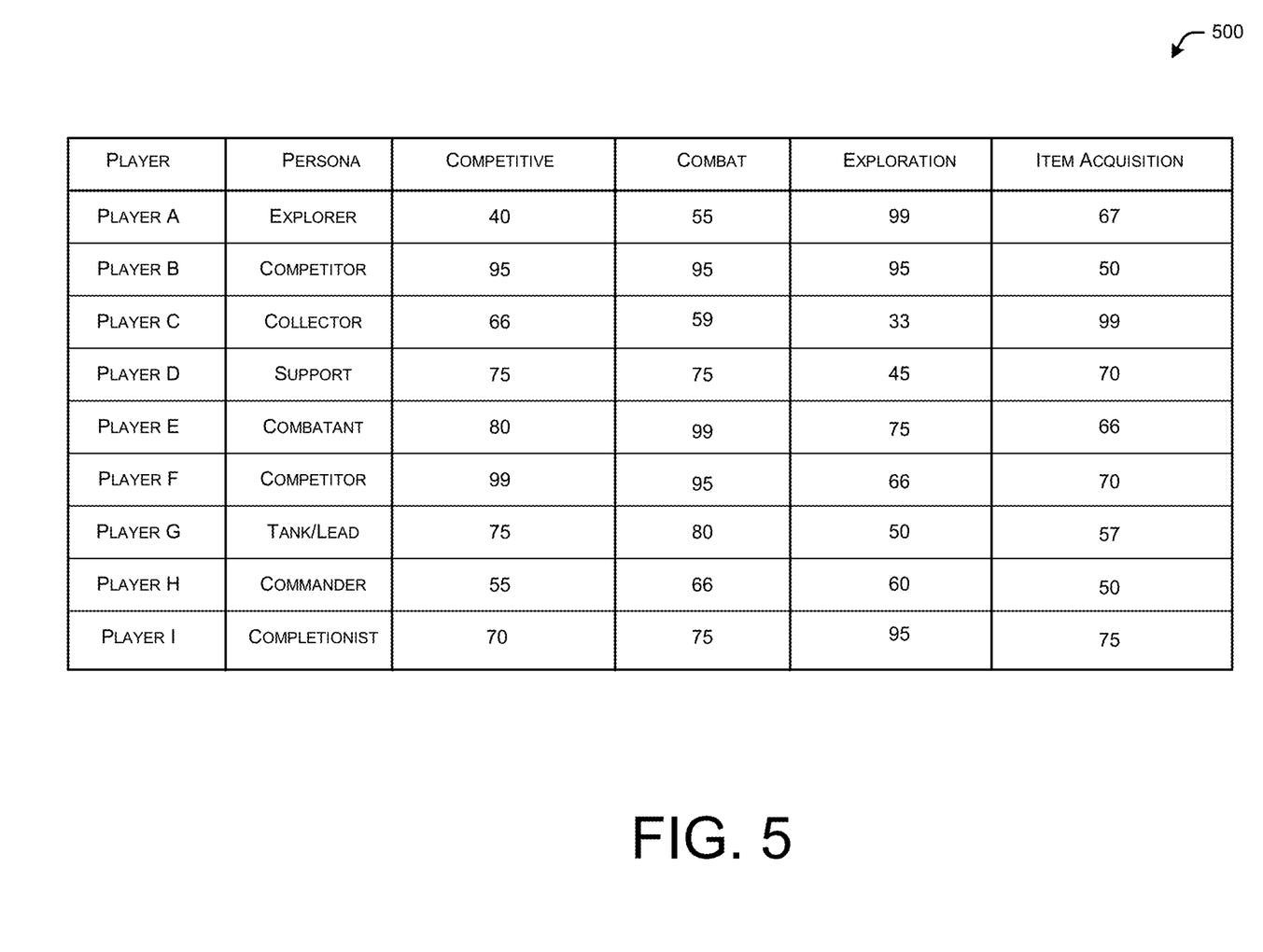
FIG. 5 illustrates a chart of an example set of player personas including a general persona (e.g., archetype) and four persona dimensions (e.g., a competitiveness dimension, a combat dimension, an exploration dimension, and an item acquisition dimension), in accordance with example embodiments of the disclosure.

FIG. 5 illustrates a chart 500 of an example set of player personas including a general persona (e.g., archetype) and four persona dimensions (e.g., a competitiveness dimension, a combat dimension, an exploration dimension, and an item acquisition dimension), in accordance with example embodiments of the disclosure.

The chart 500 shows a number of players, such as player A through player I who have corresponding player personas as shown. For example, player A may have a general persona of explorer and an explorer persona dimension of 99, while player C may have a general persona of collector and an item acquisition persona dimension of 99. The example general personas shown in this example are non-limiting and many other suitable general personas would be apparent to one of ordinary skill in the art in view of this disclosure. Similarly, the persona dimensions used in this example may be on a 0-100 range, but any suitable range (e.g., 0-1, 0-50, etc.) may be used according to example embodiments of the disclosure. As discussed above, the player personas may be determined by the persona system(s) 130 based on gameplay data of the corresponding player. In example embodiments, the persona system(s) 130, by using a player's identifier, may be able to access the player's gameplay data from the player datastore 132 and access the player's persona from the persona datastore 134.

Figure 6:
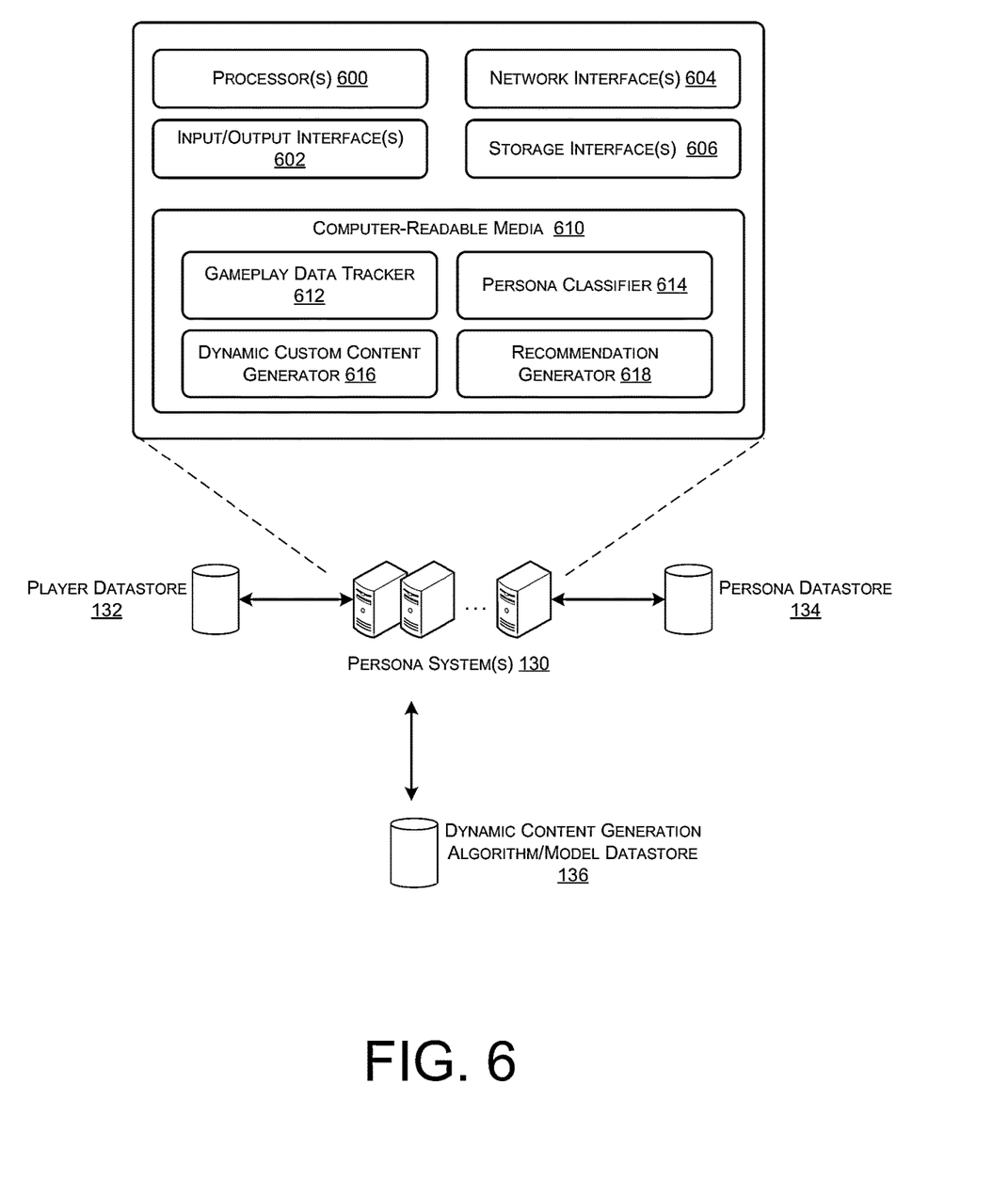
FIG. 6 illustrates a block diagram of an example persona system(s) that may provide persona for online games, in accordance with example embodiments of the disclosure.

FIG. 6 illustrates a block diagram of an example persona system(s) 130 that may enable computer gaming including the presentation of persona driven dynamic content, in accordance with example embodiments of the disclosure. The persona system(s) 130 may include one or more processor(s) 600, one or more input/output (I/O) interface(s) 602, one or more network interface(s) 604, one or more storage interface(s) 606, and computer-readable media 610.

In some implementations, the processors(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 600 may possess its own local memory, which also may store program modules, program data, and/or one or more operating system(s). The one or more processor(s) 600 may include one or more cores.

The one or more input/output (I/O) interface(s) 602 may enable the persona system(s) 130 to detect interaction with a user and/or other system(s), such as one or more game system(s) 110. The I/O interface(s) 602 may include a combination of hardware, software, and/or firmware and may include software drivers for enabling the operation of any variety of I/O device(s) integrated on the persona system(s) 130 or with which the persona system(s) 130 interact, such as displays, microphones, speakers, cameras, switches, and any other variety of sensors, or the like.

The network interface(s) 604 may enable the persona system(s) 130 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of a cellular radio, a wireless (e.g., IEEE 802.1x-based) interface, a Bluetooth® interface, and the like. In some embodiments, the network interface(s) 604 may include radio frequency (RF) circuitry that allows the persona system(s) 130 to transition between various standards. The network interface(s) 604 may further enable the persona system(s) 130 to communicate over circuit-switch domains and/or packet-switch domains.

The storage interface(s) 606 may enable the processor(s) 600 to interface and exchange data with the computer-readable medium 610, as well as any storage device(s) external to the persona system(s) 130, such as the player datastore 132, the persona datastore 134 and the dynamic content generation algorithm or model datastore 136.

The computer-readable media 610 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 610 may be implemented as computer-readable storage media (CRSM), which may be any available physical media accessible by the processor(s) 600 to execute instructions stored on the computer readable media 610. In one basic implementation, CRSM may include RAM and Flash memory. In other implementations, CRSM may include, but is not limited to, ROM, EEPROM, or any other tangible medium which can be used to store the desired information and which can be accessed by the processor(s) 600. The computer-readable media 610 may have an operating system (OS) and/or a variety of suitable applications stored thereon. The OS, when executed by the processor(s) 600 may enable management of hardware and/or software resources of the persona system(s) 130.

Several functional blocks having instruction, data stores, and so forth may be stored within the computer-readable media 610 and configured to execute on the processor(s) 600. The computer readable media 610 may have stored thereon a gameplay data tracker block 612, a persona classifier block 614, a dynamic custom content generator block 616 and a recommendation generator block 618. It will be appreciated that each of the functional blocks 612, 614, 616, and 618 may have instructions stored thereon that when executed by the processor(s) 600 may enable various functions pertaining to the operations of the persona system(s) 130.

The instructions stored in the gameplay data tracker block 612, when executed by the processor(s) 600, may configure the persona system(s) 130 to identify player(s) and collect or track gameplay data from the player(s) and store the gameplay data in the player datastore 132. In some cases, the processor(s) 600 may request player identification information and gameplay data, such as from the game system(s) 110 and/or game client devices(s) 120.

The instructions stored in the persona classifier block 614, when executed by the processor(s) 600, may configure the persona system(s) 130 to determine the persona of players based on the gameplay data tracked by the gameplay data tracker block 612. For example, the processor(s) 600 may use gameplay data to determine personas including an archetype classification and/or a collection of measurements for a plurality of persona dimensions. The persona dimensions may be indicators of how much of the player's time did the player spend in combat; how much of the map did the player explore; how often did the player opt for harder/easier challenges, how fast was the player's progression in the main storyline (in relation to the average), and so on. The persona dimensions and other player data may then be input to a model or algorithm that approximates players preferences in relation to general behavior personas or archetypes (e.g., competitor, explorer, completionism, etc.). Such persona data is not limited to particular persona data and may include other dimensions such as team history data, playstyle data, and so on.

The instructions stored in the dynamic custom content generator block 616, when executed by the processor(s) 600, may configure the persona system(s) 130 to retrieve an algorithm or model corresponding to the custom content to be generated and input the player's persona into the algorithm or model generate the custom content based at least in part on the player's persona.

The instructions stored in the recommendation generator block 618, when executed by the processor(s) 600, may configure the persona system(s) 130 to retrieve or generate an average persona for the player bases of the additional games and or the additional in-game content. The persona system(s) 130 may then compare the average persona for the player bases to the persona of the current player to determine a degree of similarity. The persona system(s) 130 may recommend the additional games or unlockable in-game content whose average persona has the highest degree of similarity with the current player or whose degree of similarity meets or exceeds a threshold.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and datastores can be in communication with each other and/or other datastores, such as a centralized datastore, or other types of data storage devices. When needed, data or information stored in a memory or datastore may be transmitted to a centralized datastore capable of receiving data, information, or data records from more than one datastore or other data storage devices. In other embodiments, the datastores shown can be integrated or distributed into any number of datastores or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to:
receive a request for content based on a persona of a player;
receive gameplay data associated with gameplay of the player in one or more games;
generate a player persona of the player based on the gameplay data associated with the gameplay of the player in the one or more games;
generate, based at least in part on a portion of the player persona of the player, custom persona based content for the player, wherein the custom persona based content for the player is custom content for the player in a game associated with the player including:
retrieving a dynamic content generation algorithm or model from a datastore based at least in part on the request, the dynamic content generation algorithm or model associated with the content based on the persona of the player;
inputting at least a portion of the player persona into the dynamic content generation algorithm or model; and
receiving a result of the dynamic content generation algorithm or model; and
output the custom persona based content for the player in response to the request, wherein the custom persona based content includes at least the result of the dynamic content generation algorithm or model.

2. The system of claim 1, wherein the custom persona based content is dynamically generated custom content in a game currently being played by the player.

3. The system of claim 1, wherein generating the player persona of the player is further based on additional gameplay data associated with additional gameplay of the player in one or more additional games.

4. The system of claim 3, wherein the player persona comprises a general persona classification and a plurality of persona dimensions associated with the gameplay of the player in the one or more games and the additional gameplay of the player in the one or more additional games.

5. The system of claim 2, wherein the dynamically generated custom content in the game currently being played by the player is procedurally generated in-game content.

6. The system of claim 1, wherein the player persona comprises a general persona classification and a plurality of persona dimensions associated with the gameplay of the player in the one or more games and the player persona is determined at least in part by:
normalizing one or more portions of the gameplay data associated with respective individual games of the one or more games to a normal of a respective individual game to produce normalized gameplay data for the player;
determining the plurality of persona dimensions based on weighted averages of the normalized gameplay data, the weighted averages being based at least in part on play time of the player in the respective individual games; and
determining the general persona classification based at least in part on a highest persona dimension of the plurality of persona dimensions.

7. The system of claim 1, wherein the gameplay data associated with gameplay of the player in the one or more games includes at least gameplay data associated with gameplay of the player in a different game of the one or more games.

8. The system of claim 5, wherein the procedurally generated in-game content comprises one or more of: a level map; one or more enemies; one or more challenges to be presented in-game to the player; or one or more in-game items to be obtained by the player.

9. A computer-implemented method, comprising:
receiving a request for content based on a persona of a player;
receiving gameplay data associated with gameplay of the player in one or more games;
generating a player persona of the player based on the gameplay data associated with the gameplay of the player in the one or more games;
generating, based at least in part on a portion of the player persona of the player, custom persona based content for the player, wherein the custom persona based content for the player is custom content for the player in a game associated with the player including:
retrieving a dynamic content generation algorithm or model from a datastore based at least in part on the request, the dynamic content generation algorithm or model associated with the content based on the persona of the player;
inputting at least a portion of the player persona into the dynamic content generation algorithm or model; and
receiving a result of the dynamic content generation algorithm or model; and
outputting the custom persona based content for the player in response to the request, wherein the custom persona based content includes at least the result of the dynamic content generation algorithm or model.

10. The computer-implemented method of claim 9, wherein the custom persona based content is dynamically generated custom content in a game currently being played by the player.

11. The computer-implemented method of claim 10, wherein the dynamically generated custom content in the game currently being played is procedurally generated in-game content.

12. The computer-implemented method of claim 9, wherein generating the player persona of the player is further based on additional gameplay data associated with additional gameplay of the player in one or more additional games.

13. The computer-implemented method of claim 9, wherein the player persona comprises a general persona classification and a plurality of persona dimensions associated with the gameplay of the player in the one or more games.

14. The computer-implemented method of claim 13, wherein the player persona is determined at least in part by:
- normalizing one or more portions of the gameplay data associated with respective individual games of the one or more games to a normal of a respective individual game to produce normalized gameplay data for the player;
- determining the plurality of persona dimensions based on weighted averages of the normalized gameplay data, the weighted averages being based at least in part on play time of the player in the respective individual games; and
- determining the general persona classification based at least in part on a highest persona dimension of the plurality of persona dimensions.

15. One or more non-transitory computer-readable media storing computer-executable instructions that, when executed by one or more processors, cause the one or more processors to perform operations comprising:
- receiving a request for content based on a persona of a player;
- receiving gameplay data associated with gameplay of the player in one or more games;
- generating a player persona of the player based on the gameplay data associated with the gameplay of the player in the one or more games;
- generating, based at least in part on a portion of the player persona of the player, custom persona based content for the player, wherein the custom persona based content for the player is custom content for the player in a game associated with the player including:
  - retrieving a dynamic content generation algorithm or model from a datastore based at least in part on the request, the dynamic content generation algorithm or model associated with the content based on the persona of the player:
  - inputting at least a portion of the player persona into the dynamic content generation algorithm or model; and
  - receiving a result of the dynamic content generation algorithm or model; and
- outputting the custom persona based content for the player in response to the request, wherein the custom persona based content includes at least the result of the dynamic content generation algorithm or model.

16. The one or more non-transitory computer-readable media of claim 15, wherein the custom persona based content is dynamically generated custom content in a game currently being played by the player.

17. The one or more non-transitory computer-readable media of claim 16, wherein the dynamically generated custom content in the game currently being played by the player is procedurally generated in-game content.

18. The one or more non-transitory computer-readable media of claim 17, wherein the procedurally generated in-game content comprises one or more of:
- a level map;
- one or more enemies;
- one or more challenges to be presented in-game to the player; or
- one or more in-game items to be obtained by the player.

19. The one or more non-transitory computer-readable media of claim 15, wherein the player persona comprises a general persona classification and a plurality of persona dimensions associated with the gameplay of the player in the one or more games.

20. The one or more non-transitory computer-readable media of claim 19, wherein the player persona is determined at least in part by:
- normalizing one or more portions of the gameplay data associated with respective individual games of the one or more games to a normal of a respective individual game to produce normalized gameplay data for the player;
- determining the plurality of persona dimensions based on weighted averages of the normalized gameplay data, the weighted averages being based at least in part on play time of the player in the respective individual games; and
- determining the general persona classification based at least in part on a highest persona dimension of the plurality of persona dimensions.

* * * * *